Feb. 8, 1966  E. H. MUMFORD  3,233,999
INVERT MECHANISM ON GLASS FORMING MACHINE
Filed Sept. 5, 1962  2 Sheets-Sheet 1
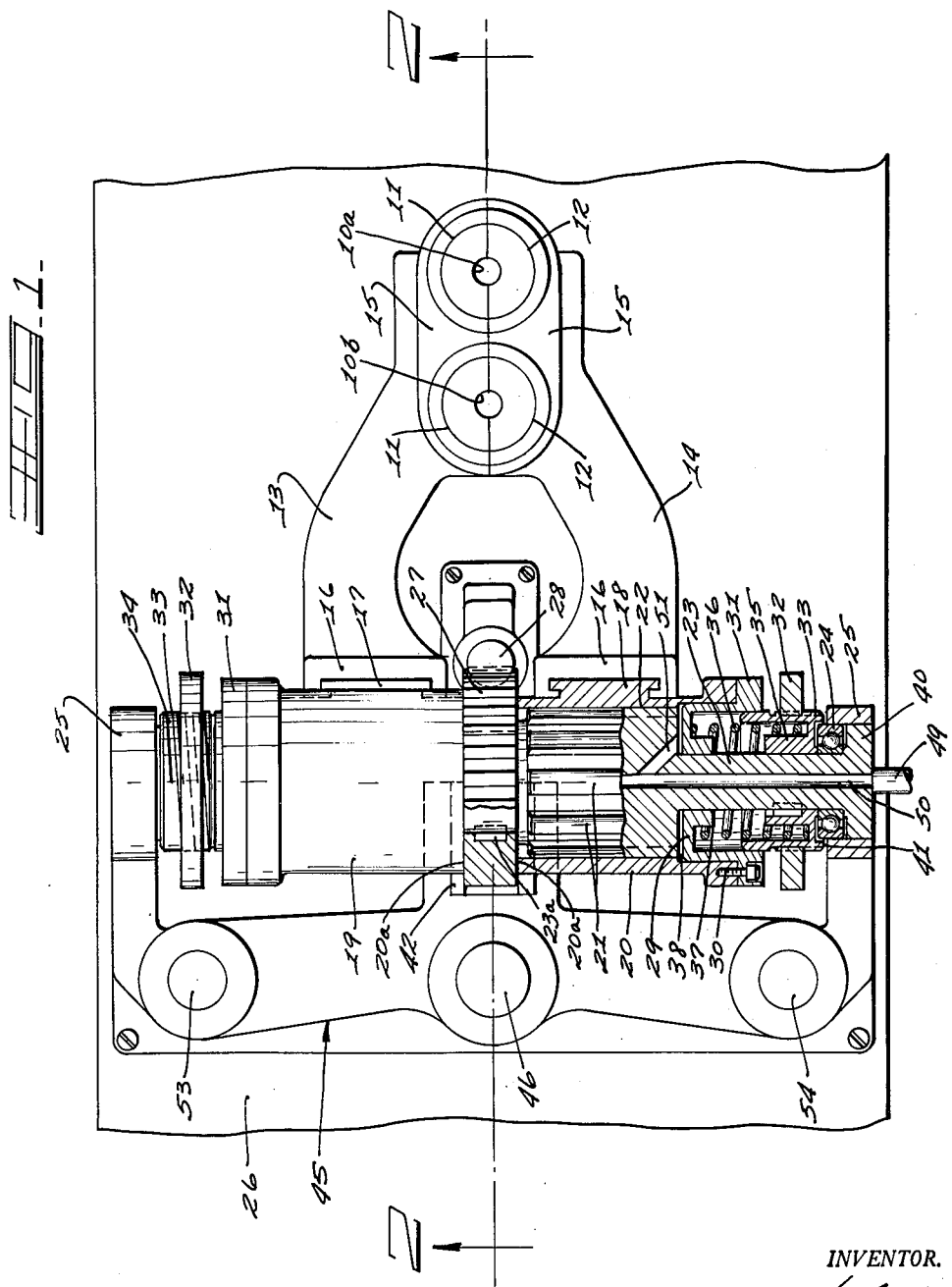
INVENTOR.
EUSTACE H. MUMFORD
BY
J. R. Nelson and
D. T. Innis
ATTORNEYS Feb. 8, 1966  E. H. MUMFORD  3,233,999
INVERT MECHANISM ON GLASS FORMING MACHINE
Filed Sept. 5, 1962  2 Sheets-Sheet 2
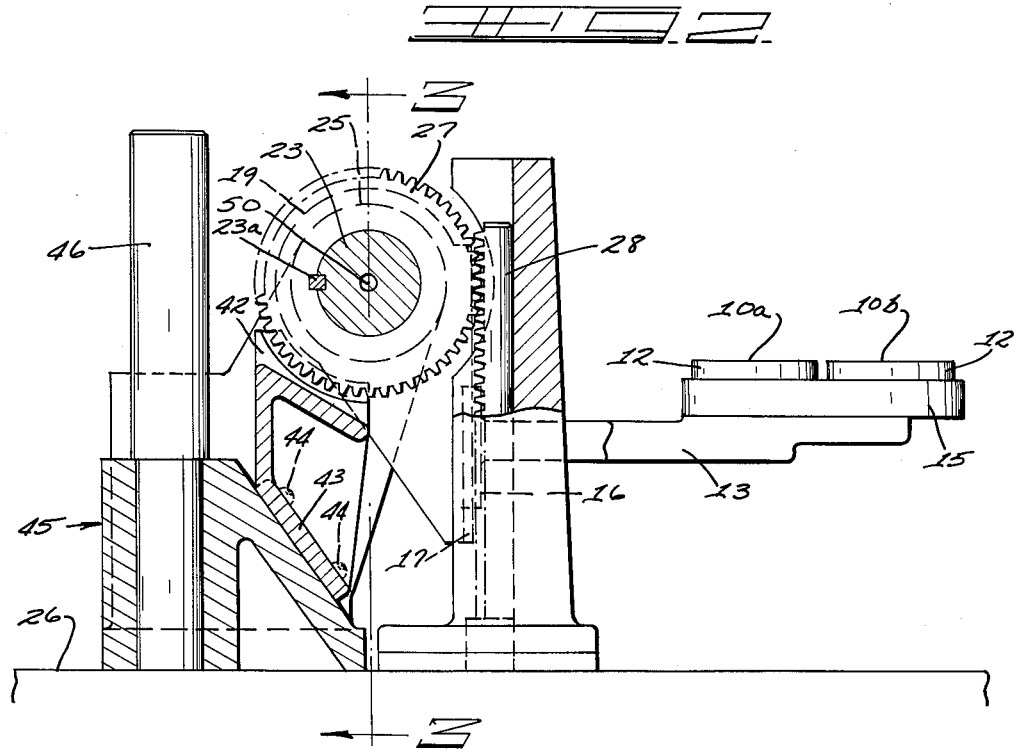
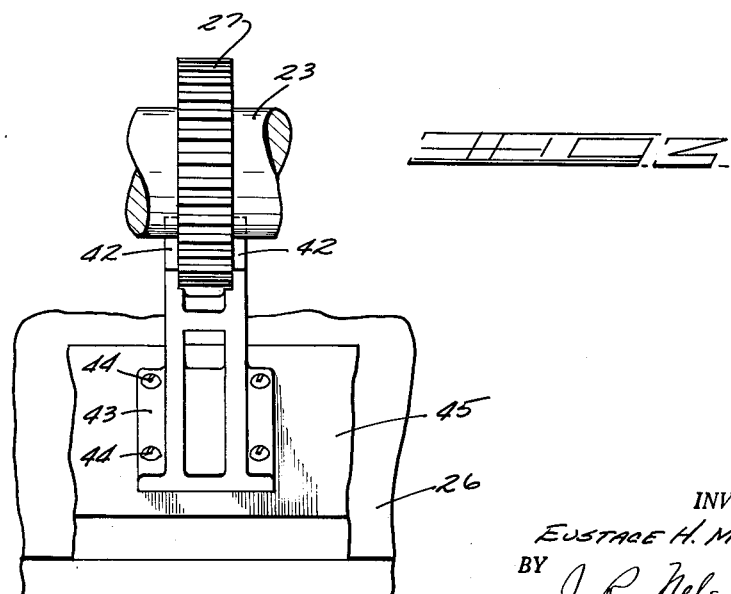
INVENTOR.
EUSTACE H. MUMFORD
BY J. R. Nelson and
D. T. Innis
ATTORNEYS United States Patent Office 3,233,999
Patented Feb. 8, 1966

3,233,999
INVERT MECHANISM ON GLASS
FORMING MACHINE
Eustace H. Mumford, Ottawa Lake, Mich., assignor to
Owens-Illinois Glass Company, a corporation of Ohio
Filed Sept. 5, 1962, Ser. No. 221,556
10 Claims. (Cl. 65—359)

The present invention relates to improvements in the invert mechanism of the type employed on an I.S. type glassware forming machine; and, particularly the invention relates to a positive guide on the invert mechanism which will assure centering of the neck rings in the parison forming position.

In the glassware forming machine referred to, the glass is fed in charges or gobs to a parison mold assembly which forms the charge to the shape of a parison. The assembly includes a lowermost set of partible neck rings or neck mold sections, a parison mold which seats on the neck mold, a funnel and baffle mechanism, and a neck pin or plunger mechanism. The parts of the assembly are manipulated into glass forming relationship and the parison is formed in inverted position so that its neck or mouth is formed and held in the neck mold. The neck mold sections are carried by laterally shiftable mold arms that are trunnion mounted for rotation by an invert shaft. The shaft is bearing mounted on the frame of the machine and the neck mold arms are removed from the parison forming position to the blow molding position. This amounts to a rotary displacement of the neck mold arms and neck mold about the axis of the invert shaft of approximately 180°.

In the prior machine invert assemblies, for example, as shown in the early patent of Ingle, 1,911,119 (see FIGS. 2 and 3), there is provided mechanical stops defining clearances for the cylinder-piston assemblies which actuate the neck mold arms toward and away from each other for opening and closing the neck mold sections. The neck mold arms are each mounted on carriers that are connected to one of a pair of opposed fluid pressure operated cylinder-pistons that are axially slidable along the invert shaft. The invert shaft is journal mounted at its ends in bearings supported on the machine frame. Coil springs surround the invert shaft and are compressed between the housings for the end bearings and the ends of the cylinder-pistons. The springs normally move the neck mold arms toward each other to hold the neck mold sections in closed position. Fluid pressure may be admitted to the cylinders to move the pistons, the connected carriers and the neck mold arms apart and thereby open the neck mold sections. The position of the neck mold sections, when closed, is fixed by abutting the pistons of the pressure cylinders on an annular central wall portion of the invert shaft. This annular central portion of the invert shaft also serves to conduct the pressure fluid to the inner ends of each of the opposed cylinders.

Thus, in the conventional I.S. invert mechanism, the center line of the partible neck mold is determined by the manner in which the invert shaft is supported in the end bearings. A clearance need be provided between the bearing housing and the cylinder which abuts against it. The opening of the neck mold arms is limited by clearance between the outer ends of the cylinders and an axially adjustable ring portion on the bearing housing. The closing of the neck mold sections is limited by the clearance between the piston of the pressure cylinder assemblies and the central annular wall portion of the invert shaft. The invert is achieved by the drive connection of a rack in meshing engagement with a pinion that is attached on the invert shaft. It is actually necessary in practice to provide considerable clearance between the adjustable part of the bearing housing and the cylinder which abuts against it because of the thermal expansion of the metal parts that occurs during start-up of the machine. Hence, the pinion and invert shaft may move laterally on the machine to a certain extent, and, in so doing, the center line of the neck mold will not always be the same and the neck mold will not be assured proper registry with the blank mold.

The present invention has for one of its objects the provision of a positive alignment of the center line of the closed neck mold by providing a positive guide for holding the invert shaft in a predetermined aligned position on the machine regardless of end clearance between the neck mold cylinders and the end bearing housings.

Another important object of the invention is the provision of means on the carrier for the neck mold arms that will, upon closing the neck mold arms, pilot them on a common member on the invert shaft, such as the pinion, so that the neck mold sections will close at this prealigned center line on the invert shaft aligned, as above mentioned, on the machine.

And, more specifically the invention has as an object the provision of a forked, guide member on the machine frame that is in running engagement with the invert pinion which will hold the invert shaft and the mechanical elements thereon in central position for obtaining alignment of the closed neck mold sections on the machine in relation to the other parts thereof, and includes additionally a means for centrally locating the neck mold arms by piloting the carriers therefor on the invert pinion when they are moved to closed position.

Other objects and advantages thereof will become apparent to those skilled in the art from the following detailed description, taken in conjunction with the annnexed sheets of drawings, on which, by way of preferred example only, are illustrated embodiments of this invention.

In the drawings:

FIG. 1 is a plan view, partly in section, of the I.S. machine invert mechanism of the present invention;

FIG. 2 is a sectional elevational view taken along line 2—2 on FIG. 1; and

FIG. 3 is a detailed elevational view of the invert pinion and its stationary guide member mounted on the machine frame, taken along line 3—3 on FIG. 2.

As shown in FIG. 1, the neck mold unit is shown as a "double-gob" machine wherein a pair of neck molds 10a and 10b each comprised of complementary neck mold sections 11 and 12 are supported in holders 15 on the neck mold arms 13 and 14. The arms 13 and 14 are each attached by their dovetail connection 16 to dovetail bosses 17 and 18. The bosses 17 and 18 are each an integral part of the respective sleeves 19 and 20. The sleeves 19 and 20 are each internally splined and fit over complementary splines 21 on enlarged central portions 22 of the invert shaft 23. Each of the sleeves 19 and 20 is adapted for rotary motion with the shaft 23 and axial sliding movement along shaft 23.

The shaft 23 is rotatably mounted at its ends in bearings 24 that are held in journals 25 on the upright brackets of the support casting 45 attached onto the underlying frame 26 of the machine.

The shaft 23 is rotatable to transfer the neck molds 10a and 10b from the parison station, as shown, to the blow molding station (not shown), the latter station being displaced by approximately 180° of rotary movement of the mold arms from the parison station. The sectional, partible, blow molds (not shown) are mounted in a known manner on a pair of arms which are pivoted, in scissors fashion, on the vertical center pin 46. The pin 46 is rigidly mounted on the machine frame 26 by the support casting 45. There are also two vertical side pivots or shafts 53 and 54 rigidly attached to the frame by the casting 45, and the blow mold actuating linkages (not shown) that are connected to open and close the blow mold arms are pivoted on these pins in a known manner. These vertical shafts 46, 53 and 54 are herein shown to represent the blow mold position or station of the machine. The remainder of the blow mold mechanism, as well as the blank mold mechanism, have been intentionally omitted from the drawings for the sake of simplicity of illustration of the invention.

The rotation of the shaft 23 is accomplished by a pinion 27 that is rigidly secured by a key 23a to the central part of shaft 23 and in meshing engagement with a vertically disposed rack 28. The rack 28 is attached on a piston rod (not shown) of a fluid pressure operated cylinder-piston motor. The reciprocating motion of rack 28 transmits a rotary motion to the pinion 27 which in turn rotates shaft 23. The neck mold arms 13 and 14 are moved in a rotary invert path by the splined connection between shaft 23 and the two carrier sleeves 19 and 20.

The neck mold arms are moved toward and away from each other for opening and closing the neck mold sections and axially of the shaft 23 by the sleeves 19 and 20 sliding along the splines 21. This movement is accomplished by opposed, single-acting, fluid-pressure operated, cylinder-piston assemblies. The cylinder of each assembly is formed by the outer end of the sleeves 19 and 20. The pistons 29 are attached to the end of the sleeves, such as shown by bolt 30 on the end of sleeve 20. Piston 29 slides on the end portions of shaft 23 and is provided with an annular boss 31 which is adapted to abut against the stop member 32. This stop member 32 is threaded on the end cap 33 inserted on shaft 23. The threads 34 on cap 33 permit axial adjustment of the stop member 32 thereby providing an adjustment of the "open" position of the neck mold and the arms 13 and 14. The mold arms are moved open by supplying fluid under pressure at the desired time through the inlet port 49 in the end cap 40. Port 49 communicates with the passage 50 which connects through a conduit 51 to each of the cylinders at space 38. The application of fluid under pressure will force the pistons 29 outwardly which further compresses the springs 36. As the pistons move outwardly, their attached carrier sleeves 19 and 20 slide on the splines 21 and move the mold arms away from each other, thereby opening the neck molds 10a and 10b.

The cap 33 abuts against either of the end bearings 24 or 25 and has an annular recess 35 to accommodate a coil spring 36. The spring is also accommodated by the internal recess 37 in the piston 29. Spring 36 forces the piston 29 axially inwardly on the shaft 23, and in so doing shifts the arms 13 and 14 toward each other. The arms are centered in closing by the inner ends of the sleeves or bosses 20a engaging the opposite sides faces of the pinion 27. These side faces of the pinion serve as closely spaced, centrally located guide surfaces on the invert shaft. Thus, the sleeves 19 and 20 are piloted in closing onto the pinion 27 defining the aligned center line for closing the neck molds 10a and 10b with respect to the parison mold and other cooperating parts of the machine. This is an important feature of the invention. It should be noted that the piston no longer seats or abuts against the central annular wall portion of the invert shaft as was the case in the prior machines. There is herein provided a clearance or space, at 38, when the neck mold sections 11 and 12 are closed. The neck molds are, therefore, always mechanically centered on the guide surfaces provided on the invert shaft, such as the side faces of pinion 27.

Another important feature of the invention will now be described. The journal mountings 25, it should be noted, are here provided with an end cap 40 on the shaft 23. The facing 41 of cap 33 may be slightly spaced from the opposite face of the end bearings 25 when the unit is cold. Thus, when the machine is elevated in temperature after starting the glass forming operation, the thermal expansion of the metal parts is compensated for by this space between parts 41 and 25. The shaft 23, on the other hand, is held in its centered position by a bifurcated fork-like member 42 that is bolted at its lower bracket 43 and bolts 44 onto the support casting 45 at the portion whereat the blow mold center pin 46 is rigidly mounted on the machine frame 26. This is best shown on FIGS. 2 and 3. The guide fork 42 is in engagement with the guide surfaces on the invert shaft, as the guide fork straddles pinion 27 and bears against opposite side faces of the pinion to hold the invert shaft and its associated parts in a predetermined fixed position on the machine frame. This holds the invert shaft in a steady fixed position with respect to the center line of the neck mold on the machine so that regardless of thermal expansion or clearance at the journal-bearing end mountings for the shaft 23, the center line for the neck molds 10a and 10b will not vary. In this manner the above-mentioned problem is alleviated by preventing the invert pinion and shaft from having lateral movement, and, at the same time the neck mold arms when in closed position—the critical position—will always be closed along the same radial center line. Thusly, the problem created by the necessity of thermal expansion take-up clearance between the invert shaft and its end support bearings is overcome.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In an invert mechanism including a horizontal shaft rotatably mounted on a frame for rotation about its axis, a pinion on said shaft, mold arms connected on said shaft for rotation therewith and movement axially thereon, a partible neck mold comprising sections carried by each said arms, opposed, reciprocating motor means carried on said shaft and connected to said arms for moving them axially of said shaft to open and close said neck mold, and a rack meshing with said pinion operable for rotating the latter in opposite directions, the improvement comprising means mounted on the frame and in engagement with the opposite radial side faces of pinion for positively holding the pinion and invert shaft in a fixed lateral position with respect to the frame.

2. The invert mechanism defined in claim 1, wherein the means engaging the pinion comprises a bifurcated member straddling said pinion and engaging the latter's opposite radial side faces, and means providing a rigid connection between the bifurcated member and the frame.

3. In an invert mechanism of the class described including a horizontal shaft rotatably mounted on a frame, mold arms slidably connected on said shaft for rotation therewith and movement axially thereon, a partible neck mold comprising sections carried by each of said arms, opposed, reciprocating motor means carried on said shaft and connetced to said arms for moving them axially along said shaft to open and close said neck mold, and drive means connected to said shaft and operable for rotating the latter in opposite directions, the improvement comprising annular parallel guide surfaces centrally on said shaft, and means rigidly mounted on the frame and in engagement with said guide surfaces for positively holding the invert shaft in a fixed lateral position with respect to the frame to continuously maintain the neck mold in a central position.

4. In an invert mechanism of the class described including a horizontal shaft rotatably mounted on a frame, a pair of carriers on said shaft for rotation therewith and movement axially thereon toward and away from each other, a pair of mold arms connected to said carriers for movement therewith, a partible neck mold comprising sections carried by each said arms, opposed, reciprocating motor means carried on said shaft and connected to said carriers for moving them axially of said shaft to open and close said neck mold, and power means connected to said shaft and operable for rotating the latter in opposite directions, the improvement comprising central parallel guide surfaces on said shaft and means on each of the carriers engageable with said guide surfaces during axial movement of said carriers toward each other defining a centered closed position of the neck mold sections with respect to the invert shaft.

5. The invert mechanism defined in claim 4, wherein the power means comprises a pinion centrally on said shaft, said pinion having opposed radial side faces which comprise said central guide surfaces on the shaft, and the said means on each of the carriers comprise a boss on the carriers engageable with the opposite radial side faces of said pinion.

6. The combination of a machine frame, a horizontal shaft mounted for rotation about its axis on the machine frame, power mechanism for rotating the shaft, mold arms connected to the shaft for lengthwise movement thereon and for rotation therewith, a partible mold comprising mold sections carried by said arms, means comprising fluid operated motors for moving the arms lengthwise of the shaft and thereby opening and closing the mold, and centering mechanism engageable with the mold arms and the shaft comprising parallel guide surfaces on said shaft that are closely spaced on either side of a vertical plane normal to the axis of the shaft and common to the center line of the neck mold, cooperating means on the mold arms engageable with said guide surfaces to limit the closing movement of the neck mold along a center line normal to the axis of the shaft, and a guide element connected on the frame and engaging said guide surfaces on the shaft to maintain the center line of the neck mold constant in a vertical plane with respect to the machine frame.

7. The combination defined in claim 6, wherein the power mechanism for rotating the shaft is a pinion centrally on the shaft and a reciprocable rack in mesh with said pinion, and the guide surfaces on said shaft comprise the opposite radial side faces of the pinion.

8. The combination defined in claim 7, wherein the cooperating means on the mold arms comprise a boss carried with each mold arm and engageable with one of said radial side faces of the pinion.

9. The combination defined in claim 7, wherein the guide element comprises a bifurcated, fork-like member connected on the frame and engaging the opposed, radial side faces of the pinion.

10. In a glassware forming machine, an invert mechanism for opening and closing a partible neck mold and for moving said neck mold to and from a parison forming station, said neck mold comprising complementary sections mounted on a pair of mold arms, and said mechanism includes an invert shaft rotatably mounted on said machine, the mold arms being mounted on the invert shaft for axial movement on said shaft and for rotary movement with said shaft, drive means connected to rotate said shaft in opposite directions, fluid-operated motors connected to each of the mold arms for moving them axially along the shaft, and the invert shaft having centering means for maintaining it positively located with respect to the machine comprising guide surfaces on the shaft closely spaced on either side of a vertical plane normal to the shaft, and a cooperating guide element engaging said surfaces and rigidly mounted on the machine, the centering means maintaining the neck mold arms and the neck mold centered on said plane to define the radial center of the parison forming station.

References Cited by the Examiner
UNITED STATES PATENTS

| | | | |
|---|---|---|---|
| 1,911,119 | 5/1933 | Ingle | 65—219 |
| 3,024,571 | 3/1962 | Abbott et al. | 65—361 X |

DONALL H. SYLVESTER, *Primary Examiner.*